Figure 2:
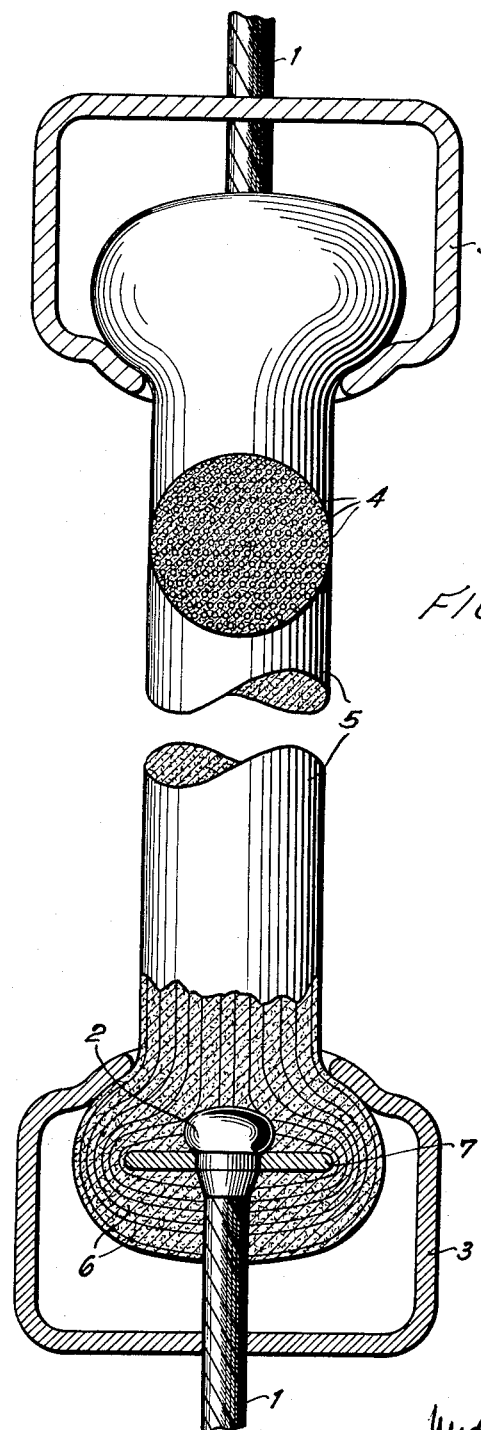

June 19, 1956     W. PASS, JR     2,751,218
ELASTIC TOW ROPE
Filed March 19, 1951     2 Sheets-Sheet 1
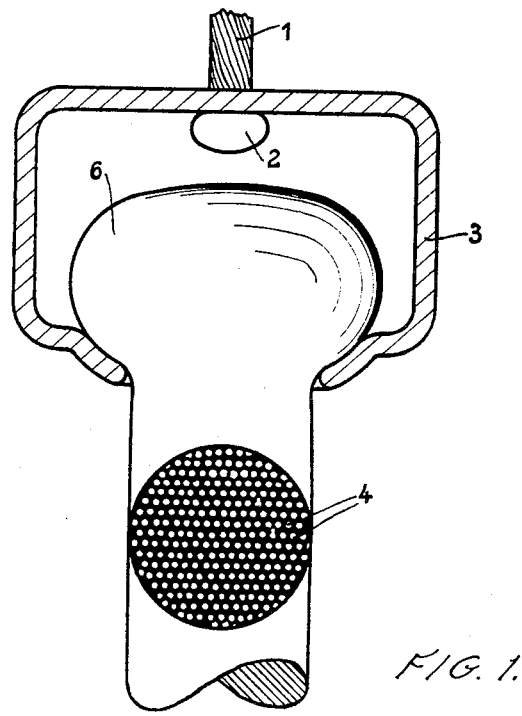
FIG. 1.
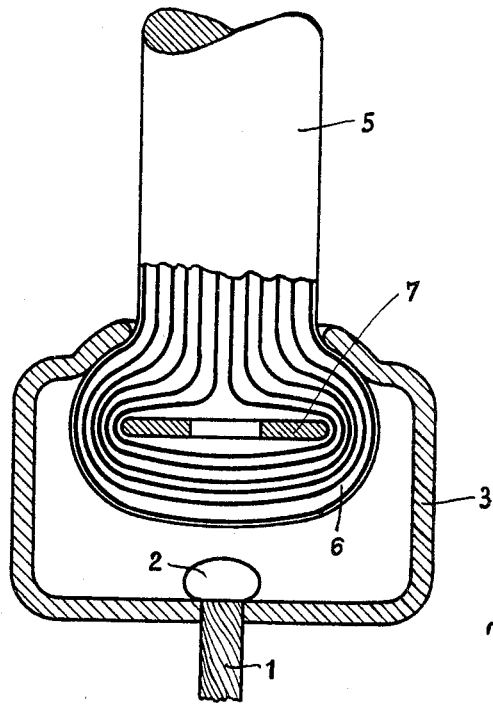
Inventor
Wilhelm Pass, Jr.
by June 19, 1956 W. PASS, JR 2,751,218
ELASTIC TOW ROPE
Filed March 19, 1951 2 Sheets-Sheet 2

INVENTOR:
WILHELM PASS, JR
BY:

United States Patent Office 2,751,218
Patented June 19, 1956

2,751,218
ELASTIC TOW ROPE

Wilhelm Pass, Jr., Schwelm, Westphalia, Germany

Application March 19, 1951, Serial No. 216,366

Claims priority, application Germany March 29, 1950

9 Claims. (Cl. 267—69)

The invention relates to a hawser, especially a tow bar or rope for power driven vehicles and consists essentially in that an elastic tension member which is formed of a plurality of thin threads of rubber or another elastic material running in the longitudinal direction of the tow rope, which are securely fused with one another, is inserted in a per se known tow bar or tow rope, for example, wire rope. This new tow bar or tow rope is distinguished by outstanding technical transport properties, since the elastic tension member is able to absorb resiliently shocks and fluctuations in load. Owing to its special shape and to its construction, the elastic tension member itself has a tensile strength and elongation which substantially exceed the hitherto usual values which can be attained with rubber ropes of unitary cross section. Above all however, the elastic tension member has a surprisingly high notch strength. Even cuts, tears or like damage do not impair this notch strength. Cuts once made do not tear further inwards, since only a limited number of threads is damaged at a time and the undamaged threads prevent any further tears. The elastic portion of the tow rope forms above all, a unitary whole in contradistinction to known elastic hawsers of a plurality of rubber threads, in which these lie separately side by side and are only held together by an outer band. The invention is based on the recognition that despite the fusing of the individual rubber threads to a unitary whole high notch strength can be achieved. The fastening of the elastic tension member to the actual wire rope can be effected either by arranging eyes, sockets, or similar coupling means on the wire rope, in which the ends of the elastic tension member diametrally enlarged by the insertion of rigid bodies are coupled, or also by embedding grommets or thimbles in the ends of the elastic tension member, in which the wire rope can directly engage.

The elastic tension member is fabricated by assembling a plurality of rubber threads, preferably immediately after issuing from the extrusion press, in a nozzle and fusing them one with another. The individual elastic tension members can then be cut off from a thus obtained continuous rope. For the purpose of mounting the end locking members, the end portion of each elastic tension member is split longitudinally, a grommet, thimble, disc, ring or the like inserted in the cut and the material of the elastic tension member closed again around the embedded rigid bodies by vulcanisation.

Fig. 1 is a plan view partially in section of one embodiment of the present invention; and Fig. 2 is a similar view of another embodiment of the present invention.

In the drawings, numeral 1 designates the ends of the wire rope, which are to be fastened in per se known manner to the frame of the towing and towed vehicles (not shown). The facing ends of these portions of wire rope 1 carry nodiform thickenings 2, with which they engage in coupling sleeves 3. The two coupling sleeves 3 are connected to one another through an elastic tension member 5.

The elastic tension member 5 consists, as the drawn-in section indicates, of a large number of thin rubber threads 4, which run in the longitudinal direction of the rope, that is to say therefore in the direction of travel and are indissolubly united to one another, in that they are fused to one another in a nozzle under the action of pressure and heat. The section is only shown diagrammatically. In fact the fusing is carried to such an extent, that the individual threads can no longer or only indistinctly be recognised. On the other hand, the fusing is not carried to such an extent, that the individual threads are completely dissolved. They are on the contrary, still present in their structure and exert their effect in the surprisingly high notch strength of the rope so formed, in that they take up tears, cuts or other damage, so that the threads undamaged by the cut reliably prevent any spreading of the tear. Tensile tests on a rope of about 25 mm. diameter, which was about half cut through, have shown that this seriously damaged rope was still able to bear a weight of a thousand kilograms and more, without tearing any further. This constitutes a considerable advance compared with a rubber rope of unitary cross section, as such rubber ropes consisting of a unitary structure are very sensitive to surface damage and especially damage due to cuts, the damage spreads by tearing and finally they sever.

In the Figure 1 embodiment, rings 7 of metal, which are located at right angles to the longitudinal direction of the elastic tension member, are embedded in the two ends 6 of the elastic tension member 5. To this end the elastic tension member is split longitudinally at the ends, the ring, which naturally may also be designed as a complete disc, is inserted and the material of the buffer is closed up again round the ring by vulcanisation. This method of embedding the rigid body 7 increasing the diameter of the elastic tension member at the ends has the advantage that the individual threads 4 of the elastic tension member 5 are substantially preserved and in general, at least, they follow the flow of the lines of force. These thickened ends 6 of the elastic tension member are then suspended in well rounded off dished bearings of coupling sleeves 3 provided with an insertion slot with lateral opening.

Instead of the rigid end disc 7 a per se known grommet or thimble can also be embedded in the ends of the elastic tension member in similar manner, as shown in Figure 2, to which the ends of the wire rope 1 can be directly hooked on. Altogether, several other embodiments and applications are still possible within the scope of the invention. Thus in the scope of the invention, rubber means not merely natural rubber, but also synthetic rubber or other elastic substances fusible with one another. The elastic rope formed according to the invention from a plurality of individual threads securely united by fusing or cementing could with advantage also be employed for other purposes, in which importance is attached to great tensile strength, high elongation and above all, to high notch strength. Finally in place of the wire rope any other known means for towing purposes could also be used, for example, towing bars or the like.

I claim:

1. A coupling device, comprising in combination, a resilient elongated unitary member composed of a plurality of elongated rubber filaments extending parallel and adjacent to each other and cohering to each other along their lengths; and connecting means at the opposite ends of said resilient elongated unitary member for connecting the same to other members, said connecting means including at each end of said member an enlargement forming part of said member and having an annular shoulder located inwardly from the extremity of said member and directed away from said extremity; and a housing enclosing said enlargement forming part, and having an annular end wall having an inner diameter smaller than the maximum diameter of said shoulder and engaging said shoulder.

2. A coupling device, comprising in combination, a resilient elongated unitary member composed of a plurality of elongated rubber filaments extending parallel and adjacent to each other and being at least partially fused to each other along their lengths; connecting means secured at the opposite ends of said resilient elongated unitary member, said connecting means including at each end of said member an enlargement forming part of said member and having an annular shoulder located inwardly from the extremity of said member and directed away from said extremity; and a housing enclosing said enlargement forming part, and having an annular end wall having an inner diameter smaller than the maximum diameter of said shoulder and engaging said shoulder; and rope end portions connected to each of said housings at opposite ends of said resilient unitary member.

3. A coupling device, comprising in combination, a resilient elongated unitary member composed of a plurality of elongated resilient plastic filaments extending parallel and adjacent to each other and being at least partially fused to each other along their lengths; a rigid member embedded in each end of said resilient unitary member so that the end portions of said unitary member have a larger diameter than the intermediate portion thereof; and connecting sleeve members secured at the opposite ends of said resilient elongated unitary member fitting over and engaging the enlarged end portions thereof so as to be held against removal therefrom.

4. A coupling device, comprising in combination, a resilient elongated unitary member composed of a plurality of elongated resilient plastic filaments extending parallel and adjacent to each other and being at least partially fused to each other along their lengths; a rigid member embedded in each of said resilient unitary member so that the end portions of said unitary member have a larger diameter than the intermediate portion thereof; and connecting sleeve members secured at the opposite ends of said resilient elongated unitary member, said sleeve members being of hollow substantially cylindrical form each having an arcuate inwardly extending rim fitting around and engaging the enlarged end portions of said unitary member so as to hold said connecting sleeve members against removal therefrom.

5. A coupling device, comprising in combination, a resilient elongated unitary member composed of a plurality of elongated resilient plastic filaments extending parallel and adjacent to each other and being at least partially fused to each other along their lengths; a rigid member embedded in each end of said resilient unitary member so that the end portions of said unitary member have a larger diameter than the intermediate portion thereof; connecting sleeve members secured at the opposite ends of said resilient elongated unitary member fitting over and engaging the enlarged end portions thereof so as to be held against removal therefrom; and rope end portions connected to each of said connecting sleeve members at opposite ends of said resilient unitary member.

6. A coupling device, comprising in combination, a resilient elongated unitary member composed of a plurality of elongated resilient plastic filaments extending parallel and adjacent to each other and being at least partially fused to each other along their lengths; a rigid plate member embedded in each end of said resilient unitary member so that the end portions of said unitary member have a larger diameter than the intermediate portion thereof, each of said rigid plate members being arranged transverse to the length of said unitary member; and rope end portions extending into the ends of said unitary member and secured to said rigid plate members so as to be securely held thereby from removal therefrom when subjected to tensile stress.

7. A coupling device, comprising in combination, a resilient elongated unitary member composed of a plurality of elongated resilient plastic filaments extending parallel and adjacent to each other and being at least partially fused to each other along their lengths; a rigid plate member embedded in each end of said resilient unitary member so that the end portions of said unitary member have a larger diameter than the intermediate portion thereof, each of said rigid plate members being arranged transverse to the length of said unitary member and being formed with an aperture therein; and rope end portions extending into the ends of said unitary member and through said apertures of said rigid plate members embedded therein, said rope end portions having enlarged ends engaging the inwardly facing surfaces of said rigid plate members adjacent the apertures therein so as to be securely held thereby from removal therefrom when subjected to tensile stress.

8. A coupling device, comprising in combination, a resilient elongated unitary member composed of a plurality of elongated rubber filaments extending parallel and adjacent to each other and being at least partially fused to each other along their lengths; a rigid plate member embedded in each end of said resilient unitary member so that the end portions of said unitary member have a larger diameter than the intermediate portion thereof, each of said rigid plate members being arranged transverse to the length of said unitary member; and rope end portions extending into the ends of said unitary member and secured to said rigid plate members so as to be securely held thereby from removal therefrom when subjected to tensile stress.

9. A coupling device, comprising in combination a resilient elongated unitary member composed of a plurality of elongated resilient plastic filaments extending parallel and adjacent to each other and being at least partially fused to each other along their lengths, said filaments being arranged so as to form loops at and within the opposite ends of said unitary member; a rigid member embedded in each end of said resilient unitary member within the loops formed therein so that the end portions of said uniatry member have a larger diameter than the intermediate portion thereof; and connecting sleeve members secured at the opposite ends of said resilient elongated unitary member fitting over and engaging the enlarged end portions thereof so as to be held against removal therefrom.

References Cited in the file of this patent

UNITED STATES PATENTS

| 317,132 | Headington et al. | May 5, 1885 |
| 1,002,448 | Putnam | Sept. 5, 1911 |
| 1,822,135 | Fisher | Sept. 8, 1931 |
| 1,908,838 | Green et al. | May 16, 1933 |
| 1,923,926 | Faure-Roux | Aug. 22, 1933 |
| 2,522,526 | Manning | Sept. 19, 1950 |
| 2,537,245 | Thompson | Jan. 9, 1951 |

FOREIGN PATENTS

| 424,744 | Great Britain | Feb. 27, 1935 |
| 429,572 | Great Britain | May 31, 1935 |